United States Patent [19]

Hayashi et al.

[11] Patent Number: 4,552,806
[45] Date of Patent: Nov. 12, 1985

[54] CELLULAR GLASS COATED WITH A HEAT INSULATOR

[75] Inventors: Hiroaki Hayashi, Aichi; Toshio Kandori, Seto; Yoshiaki Fukushima, Aichi, all of Japan

[73] Assignee: Kabushiki Kaisha Toyota Chuo Kenkyusho, Japan

[21] Appl. No.: 513,029

[22] Filed: Jul. 12, 1983

[30] Foreign Application Priority Data

Jul. 16, 1982 [JP] Japan ................................ 57-124830

[51] Int. Cl.$^4$ .............................................. B32B 19/04
[52] U.S. Cl. ............................... 428/312.6; 428/317.7; 428/319.1; 428/323; 428/331; 428/324; 428/428
[58] Field of Search ............... 428/323, 331, 428, 432, 428/312.6, 312.8, 317.1, 317.7, 319.1, 404, 324, 220

[56] References Cited

U.S. PATENT DOCUMENTS

| 620,476 | 2/1899 | Michell | 428/324 X |
| 2,198,885 | 4/1940 | Price | 428/312.6 X |
| 2,233,608 | 3/1941 | Haux et al. | 428/312.6 X |
| 2,315,713 | 4/1943 | Johnson | 428/312.6 |
| 2,778,762 | 1/1957 | Eisler | 428/325 |
| 3,261,894 | 7/1966 | Seidl | 428/404 X |
| 3,466,221 | 9/1969 | Sams et al. | 428/312.6 X |
| 3,466,222 | 9/1969 | Curtis | 428/312.6 X |
| 3,468,750 | 9/1969 | Pfeifer et al. | 428/312.8 X |
| 3,959,541 | 5/1976 | King et al. | 428/317.7 X |

FOREIGN PATENT DOCUMENTS

| 510482 | 3/1955 | Canada | 428/324 |
| 0104086 | 6/1983 | Japan | 428/312.8 |
| 1025956 | 4/1966 | United Kingdom | 428/324 |

*Primary Examiner*—George F. Lesmes
*Assistant Examiner*—Nancy A. B. Swisher
*Attorney, Agent, or Firm*—Berman, Aisenberg & Platt

[57] ABSTRACT

Heat-insulating cellular glass having a surface on which an adhesive layer and a coating layer are formed. The adhesive layer comprises a solidified mixture of water glass, and a porous substance containing polyvalent ions of metals, such as Ca, Mg, Ba and Al, and the coating layer comprises a laminate of flakes of a laminar mineral. This cellular glass is widely used as a heat-insulating material having an improved thermal shock resistance.

19 Claims, No Drawings

CELLULAR GLASS COATED WITH A HEAT INSULATOR

BACKGROUND OF THE INVENTION

1. Field of the Invention:

This invention relates to cellular glass coated with an inorganic substance which improves its heat insulating property.

2. Description of the Prior Art:

Lightweight cellular glass is obtained by adding a foaming agent, such as calcium carbonate or carbon powder, to glass powder consisting mainly of silicon oxide, and heating the mixture. This cellular glass has many independent air cells, and is, therefore, low in bulk density and thermal conductivity. It is also impervious to moisture and water. Therefore, it is widely used in sheet form as a heat-insulating material for buildings, storage tanks for liquefied natural gas, or the like.

When this cellular glass is used as a building material or an inner wall facing for a chimney or the like, however, its surface is subject to damage upon exposure to flame. This and other problems impose a serious limitation on the scope of applications for which the conventional cellular glass can be effectively employed.

SUMMARY OF THE INVENTION

Accordingly, one object of the present invention is to provide cellular glass having an improved thermal shock resistance and flame resistance.

Another object is to provide cellular glass which protects against destruction by mechanical impact due to its function as a shock absorber.

A further object is to provide cellular glass having high strength and high heat and water resistance.

A still further object is to provide cellular glass having a strongly bonded coating layer through a specific adhesive layer.

More specifically, this invention provides heatinsulating cellular glass having three distinct sequential layers comprising a surface on which an adhesive layer and a coating layer are formed, the adhesive layer comprising a solidified mixture of water glass and a porous substance containing polyvalent ions of metals, such as calcium (Ca), magnesium (Mg), barium (Ba) and aluminum (Al), while the coating layer comprises a laminate of flakes of a laminar mineral.

By virtue of the coating layer of an inorganic substance, the cellular glass of this invention is not destroyed even when it is directly exposed to a flame.

This coating layer is easy to bond to the cellular glass, since it closely fits the uneven surface of the cellular glass. Further, since the mixture of water glass and porous substance retains fluidity in the beginning, it fills fine cavities in the surface of cellular glass, thus firmly bonding the coating to the cellular glass.

The cellular glass coated with a heat insulator according to this invention will now be described in further detail.

DETAILED DESCRIPTION

The heat insulator-coated cellular glass of this invention has a cellular glass base which comprises a foamed and solidified product of glass consisting mainly of silicon oxide. It has a bulk density of 0.13 to 0.5 g/cm$^3$.

The heat insulator-coated cellular glass of this invention comprises the adhesive and coating layers formed on the cellular glass base.

Referring to the adhesive layer in further detail, it is a solidified mixture of water glass and a porous substance containing polyvalent ions, such as of Mg, Ca, Al or Ba. Water glass is a colorless, highly viscous aqueous solution containing 10 to 70% by weight of an alkali silicate ($M_2O.nSiO_2$) which may be obtained by melting silicon dioxide and an alkali. In the formula, M stands for an alkali metal, such as sodium (Na), potassium (K) or lithium (Li), or a base, such as an ammonium group ($NH_4$), and n stands for a number from 1 to 4. Commercially available water glass, such as water glass No. 1, 2, or 3 (Japanese Industrial Standard) may be employed.

The porous substance containing polyvalent ions, such as of Mg, Ca, Al or Ba, may be obtained by contacting the powder of a porous material, which will hereinafter be described in detail, with a water glass solidifying agent so that the solidifying agent or the polyvalent ions therein may be incorporated into the powder by impregnation, adsorption or ion exchange.

The porous material is a material which can contain the polyvalent ions by impregnation or adsorption and which can release the polyvalent ions slowly in water glass. The preferred examples thereof include a powder of laminar mineral, such as montmorillonite, kaolinite, graphite or vermiculite, a powder of fibrous mineral having a plurality of straight pores, such as asbestos, sepiolite or attapulgite, and a powder of finely porous mineral, such as zeolite or cristobal-stone (porous cristobalite particle produced in Aomori, Japan). It is also possible to use the powder of finely porous hollow glass, cellular glass, or magnesia (MgO), calcia (CaO), magnesium hydroxide [$Mg(OH)_2$], slaked lime [$Ca(OH)_2$], calcium carbonate ($CaCO_3$) or magnesium carbonate ($MgCO_3$). It is possible to use a single substance or a mixture of two or more substances. The use of a mixture advantageously makes it possible to control its poperties in various patterns, including a variation in the slow releasability of polyvalent ions.

The powder of the porous material is obtained by crushing, preferably has a particle diameter of 0.005 to 0.5 mm to ensure slow release of the water glass solidifying agent or polyvalent ions and prevents shrinkage of the mixture during its solidification.

The water glass solidifying agent employed for this invention is a salt (containing polyvalent ions, such as those of Mg, Ca, Ba or Al), which is separated into positive and negative ions in a solvent. Specific examples of the salt include $Mg(NO_3)_2$, $CaCl_2$, $AlCl_3$ and $Ba(NO_3)_2$.

The porous substance containing polyvalent ions may be prepared by first incorporating one or more water glass solidifying agents into the powder by impregnation or adsorption. The incorporation of the water glass solidifying agent into the powder is effected by mixing the powder into the agent in the form of a solution or in the molten state. Water, alcohol, or another volatile organic solvent may be used to prepare a solution of the water glass solidifying agent. The agent in the molten state may be obtained by heating to a temperature which is equal to or higher than its melting point.

The water glass solidifying agent fills the voids or interstices in the powder, chemically bonds with the surfaces of its particles or is adsorbed by the powder through ion exchange. As a result, the water glass solidifying agent or the polyvalent ions which it contains, such as Mg, Ca, Al, or Ba ions, are bonded with the powder.

Then, the powder is removed from the solution or the like by, for example, filtration. The slow releasability of the powder may be further ensured if any excess water glass solidifying agent adhering simply to the surfaces of the particles is washed away by a solvent.

If the powder is of a substance containing exchangeable Mg ions, such as sepiolite or attapulgite, it is not always necessary to incorporate any water glass solidifying agent or polyvalent ion thereinto. If no such agent or polyvalent ion is incorporated, however, the solidified powder is slightly less resistant to water and heat than that which contains any such agent or polyvalent ion.

The adhesive layer according to the present invention comprises a solidified mixture of the water glass and the porous substance containing above-mentioned polyvalent ions. It is advisable to employ a mixing ratio which enables the dry weight of the porous substance containing polyvalent ions to occupy 0.5 to 100% of the weight of the alkali silicate in the water glass. The dry porous substance containing polyvalent ions can be obtained by, for example, drying at about 80° C. for 10 hours.

The mixture has a high fluidity in the beginning, since it is composed of water glass, and a porous substance containing a water glass solidifying agent or polyvalent ions, and capable of releasing the agent or ions slowly into water glass.

Therefore, the mixture easily fills a lot of fine cavities in the surface of cellular glass. It is easily applicable and combines well with the coating layer; and upon solidification, it forms a strong bond between the coating layer and the cellular glass.

If the mixture contains less than 0.5% by weight of the porous substance, the solidified mixture fails to be resistant to water and heat and easily cracks due to heavy shrinkage. If the mixture contains more than 100% by weight of the porous substance, it fails to show a satisfactory initial adhesive strength when it is applied to the cellular glass surface and when the coating layer is bonded thereto, thus resulting in poor work efficiency. The adhesive layer is preferably formed in the thickness of 0.1 to 2.0 mm on the cellular glass surface. When its thickness is less than 0.1 mm, it fails to bond the coating layer firmly. When its thickness exceeds 2.0 mm, the usefulness of the heat insulator-coated cellular glass according to this invention is reduced by an increase in weight and bulk density, as light weight is an important feature of cellular glass.

The adhesive layer may optionally contain about 1 to 70% by weight of silica sand, zeolite, aluminum powder, vermiculite flakes, glass powder or fiber, asbestos fiber, pulp, or the like for filling, reinforcing or shrinkage prevention purposes. It may also contain 1 to 10% by weight of an organic compound, e.g., silicone, chloroprene or vinyl acetate, as a water resistance improver.

Referring now to the coating layer in further detail, it is a layer of flakes obtained by crushing a laminar mineral, such as a clay mineral or mica, and laminated on the cellular glass surface.

The flakes of the laminar mineral have a side length of about 0.001 to 10 mm and a thickness which is not larger than 0.001 mm. They have a high aspect ratio which is at least 5. For example, flakes of vermiculite, which is a kind of clay mineral, or mica comprise a single to several thousands of layers of aluminum silicate; they have a thickness not larger than 100 $\mu$m, and an aspect ratio of at least 5.

The coating layer according to this invention may, for example, be prepared as will hereinafter be described.

A laminar mineral is crushed into flakes. If it is heated to about 1,000° C., it can be crushed easily to form flakes having a high aspect ratio which provides improved strength and flexibility to the coating layer.

The aspect ratio of the flakes depends on the crushing method and time. The preferred crushing method usually employs a mixer, grinder or ball mill and may be carried out in an either dry or wet atmosphere. If a mixer is employed, for example, it is principally possible to obtain flakes having a thickness of 0.1 to 10 $\mu$m and a surface area of, say, 2,500 to 1,000,000 $\mu$m.

The flakes thus obtained are laminated and bonded together. They can be laminated by various methods. One of them comprises dispersing the flakes in a liquid, such as water, and subjecting the dispersion to natural sedimentation or forced filtration so that the flakes may be laminated on a bottom or a filter. Another method is similar to a method for making paper. Still another method comprises forming a slurry of flakes in an appropriate liquid and applying it to a flat surface. If an inorganic binder, such as aluminum phosphate (AlPO$_4$.2H$_2$O), cement or bentonite, is added to the flakes to be laminated, it is possible to obtain a laminate of higher strength which is easier to handle. The flakes can be bonded together by a binding force which is produced by the evaporation of the liquid which the laminated flakes may contain or by a heavy pressure which is applied to the laminate in a press. Then, the laminate is bonded to the cellular glass surface by the adhesive mixture, whereby the coating layer according to this invention is formed.

Although the coating layer as hereinabove described comprises a preliminarily formed sheet bonded to the cellular glass, it is alternatively possible to form the coating layer directly on the cellular glass surface. For example, a slurry of flakes may be applied onto the adhesive layer formed on the cellular glass surface.

The laminate is mainly composed of flakes of a laminar mineral and easily mixed with water glass. When the laminate is bonded to the cellular glass surface, the adhesive mixture penetrates the laminate; and upon solidification of the mixture forming the adhesive layer, the laminate adheres strongly to the cellular glass surface to form the coating layer thereon.

According to this invention, it is also possible to employ a coating layer which has been subjected to waterproofing treatment.

The waterproofing of the coating layer according to this invention is effected by first contacting the flakes of a laminar mineral with positive ions of one or more elements selected from the Group IV elements, such as zinc (Zn), zirconium (Zr) and titanium (Ti), and the Group VIII elements, such as iron (Fe), nickel (Ni) and cobalt (Co), to effect ion exchange, and forming the flakes into a laminate in the shape of a sheet.

Further, when the laminate is heated in an oxidizing atmosphere, it obtains water resistance. Therefore, the laminate is not decomposed into flakes, even if it is left in flowing water.

The ion exchange is effected by suspending the flakes in water containing positive ions. The water containing positive ions is an aqueous solution of one or more positive ion supplying materials selected from the compounds of the elements hereinabove mentioned, {for example, sulfates, such as ferrous sulfate (FeSO4) and cobalt sulfate (CoSO4); nitrates, such as ferrous nitrate [Fe(NO3)2]; or chlorides, such as tin chloride (SnCl4) and ferrous chloride (FeCl2)}.

The heating of the laminate may be carried out by holding it at a temperature of 150° C. to 400° C. for at least 30 minutes in an oxidizing atmosphere. This treatment may be carried out by any type of furnace, including a very common electric furnace having an open-air atmosphere. The heating treatment fixes the majority of the positive ions in the flakes of a laminar mineral and renders them unexchangeable. As the positive ions cease to be exchangeable, the flakes have a cation exchange capacity not higher than 5 milliequivalents/100 g, and form a bond which is excellent in water resistance and mechanical strength.

The water-resistant laminate of laminar flakes thus obtained can be bonded to the cellular glass surface by the same method as hereinabove described for bonding the laminate not subjected to waterproofing treatment.

The invention will now be described with reference to several examples thereof.

EXAMPLE 1

One kilogram of each of kaolinite, magnesia powder, calcia powder, magnesium hydroxide, slaked lime, fine calcium carbonate powder, fine dolomite powder, sepiolite powder and fine asbestos powder was immersed and left for 30 minutes in 10 liters each of an aqueous solution containing 1 mol of magnesium nitrate [Mg(NO3)2] per liter as a water glass solidifying agent. Each powder was, then filtered, washed with water and dried to yield a porous substance containing magnesium ions.

Each porous substance was mixed with 2 kg of each of Na-water glass, K-water glass, Li-water glass and NH4-water glass. Each porous substance was mixed in the quantity of 2%, 10%, 40%, 60% and 90% by weight of the solid water glass content, whereby a total of 180 kinds of mixtures according to this invention were prepared.

On the other hand, 10 kg of granular vermiculite as a laminar mineral were placed in 100 liters of city water, and crushed in a mixer for 30 minutes. The granular vermiculite was crushed into flakes having a thickness of 0.1 to several tens of microns and a side length of several tens of to several hundred microns and suspended in water.

The suspension of the flakes was subjected to forced filtration by a filter press. Then, the flakes were dried at 55° C. for 10 hours to yield a laminate of vermiculite flakes. A laminate of mica flakes was likewise prepared.

Sheets of cellular glass having a bulk density of 0.2 g/cm$^3$ and measuring 100 mm by 50 mm by 10 mm were prepared. Each of the mixtures was applied in a thickness of about 0.5 mm onto one sheet of cellular glass, and a laminate was placed on the mixture. The assembly was left to stand under pressure for three days to allow solidification of the mixture.

Thus, heat insulate-coated cellular glass according to this invention was produced.

These cellular glass products were tested for thermal shock resistance by application of heat to the surface by a gas burner. None of them was destroyed.

EXAMPLE 2

One kilogram of sepiolite powder was immersed for 30 minutes in 10 liters of an aqueous solution containing 1 mol of aluminum sulfate [Al2(SO4)3·7H2O] per liter as a water glass solidifying agent, whereby sepiolite powder containing aluminum ions was prepared. The sepiolite powder was filtered, washed with water and dried to yield a porous substance containing aluminum ions.

The porous substance was added to 2 kg each of commercially available water glass No. 3 (JIS) containing 40% by weight of Na2O.nSiO2, in which n=2 to 3, in a ratio of 2%, 10%, 40%, 60% or 90% by weight of the solid water glass content, whereby five kinds of mixtures according this invention were prepared.

On the other hand, 100 g of granular vermiculite of the same grade as that used in EXAMPLE 1, 2 liters of water and 2 mols of ferrous sulfate (FeSO2·7H2O) as an iron ion supplying material were mixed for five minutes in a mixer having a steel blade, whereby a mixed suspension was left for four hours to allow the flakes of vermiculite to absorb ferrous ions.

The suspension was subjected to suction filtration by a Buchner funnel having a diameter of 150 mm, a suction bottle having a volume of 10 liters and filter paper. A slurry of vermiculite flakes remaining on the filter paper was mixed with clean water, and subjected to filteration again so that any excess ferrous sulfate might be washed away.

The vermiculite flakes thus obtained were suspended in one liter of clean water, and a sheet of flakes measuring 200 mm by 250 mm was formed from the suspension by a TAPPI standard papermaking machine. The sheet was dewatered in a press under a pressure of 20 g/cm$^2$, and dried by contact with a chrominum-plated steel plate heated to 80° C. for 30 minutes, whereby a laminate having a thickness of 0.5 mm was obtained.

The laminate was bonded by the above-mentioned mixture to the surface of cellular glass of the same grade as that used in EXAMPLE 1.

Then, the cellular glass was placed in an electric furnace, and held at a temperature of 350° C. for an hour, whereby the mixture was solidified, and the coating layer was rendered water resistant.

Thus, heat insulator-coated cellular glass according to this invention was obtained.

These heat insulator-coated cellular glass products were tested for thermal shock resistance by application of heat to the surface by a gas burner as in EXAMPLE 1. No peeling of the coating layer occurred, nor was any cellular glass product destroyed. Those products were also tested for water resistance by immersion in flowing water for a week. No peeling or swelling of the coating layer was found.

What is claimed is:

1. A heat-insulating product comprising three distinct layers with cellular glass as a substrate, an adhesive layer composed of a solidified mixture of water glass and a porous substance containing polyvalent ions selected from the group consisting of Mg, Ca, Al and Ba, formed on said substrate, and a coating layer composed of a laminate of flakes of a laminar mineral, formed on said adhesive layer.

2. A heat-insulating product according to claim 1, wherein said cellular glass is silicate glass.

3. A heat-insulating product according to claim 2, wherein said cellular glass has many independent cells.

4. A heat-insulating product according to claim 3, wherein said cellular glass has a bulk density of from 0.13 to 0.5 g/cm$^3$.

5. A heat-insulating product according to claim 1, wherein said water glass in said adhesive layer is an aqeuous solution containing from 10 to 70% by weight of an alkali silicate represented by the formula $M_2O \cdot nSiO_2$ in which M stands for one of Na, K, Li and NH$_4$, and n stands for one of 1, 2, 3 and 4.

6. A heat-insulating product according to claim 5, wherein said porous substance is at least one member selected from the group consisting of a powder of laminar mineral, a powder of fibrous mineral having a plurality of straight pores and a powder of finely porous mineral.

7. A heat-insulating product according to claim 6, wherein said laminar mineral is a member selected from the group consisting of montmorillonite, kaolinite, graphite and vermiculite, and said fibrous mineral is a member selected from the group consisting of asbestos, sepiolite and attapulgite.

8. A heat-insulating product according to claim 6, wherein said finely porous mineral is a member selected from the group consisting of zeolite and cristobal-stone.

9. A heat-insulating product according to claim 6, wherein the powder of said porous substance has a particle diameter of from 0.005 to 0.5 mm.

10. A heat-insulating product according to claim 6, wherein the dry weight of said porous substance occupies from 0.5 to 100% of the weight of said alkali silicate in the water glass.

11. A heat-insulating product according to claim 6, wherein said adhesive layer has a thickness of from 0.1 to 2.0 mm.

12. A heat-insulating product according to claim 6, wherein said laminar mineral of said coating layer is clay mineral or mica.

13. A heat-insulating product according to claim 12, wherein said clay mineral is vermiculite.

14. A heat-insulating product according to claim 12, wherein the flake of said laminar mineral has a side length of from 0.001 to 10 mm, a thickness of not larger than 0.001 mm and a high aspect ratio of at least 5.

15. A heat-insulating product according to claim 14, wherein said flakes of said laminar mineral are contacted with positive ions of at least one element selected from the group consisting of Group IV elements and Group VIII elements and have a cation exchange capacity not higher than 5 milliequivalents/100 g.

16. A heat-insulating product according to claim 15, wherein said Group IV elements are Zn, Zr and Ti, and said Group VIII elements are Fe, Ni and Co.

17. A heat-insulating product according to claim 6, wherein said coating layer has a thickness of from 0.2 to 10 mm.

18. A heat-insulating product according to claim 5, wherein said porous substance is a powder of fibrous mineral having a plurality of straight pores.

19. A unitary heat-insulating product which has three distinct sequential layers:
(a) a base layer of cellular glass having a bulk density of from 0.13 to 0.5 g/cm$^3$,
(b) an adhesive layer which is a solidified mixture of water glass and a porous substance containing polyvalent ions selected from the group consisting of Mg, Ca, Al and Ba and,
(c) a coating layer of laminated flakes of a laminar mineral, and wherein the adhesive layer strongly bonds the coating layer to the base layer.

* * * * *